United States Patent
Brown et al.

[11] Patent Number: 5,762,363
[45] Date of Patent: Jun. 9, 1998

[54] SEAMLESS SIDE INFLATABLE RESTRAINT DEPLOYMENT SYSTEM

[75] Inventors: Joseph Robert Brown, Grosse Ile; Marshall Lawrence Quade, Pinckney; David Webster Clark, Troy, all of Mich.

[73] Assignee: Ford Global Technologies, Inc., Dearborn, Mich.

[21] Appl. No.: 786,577

[22] Filed: Jan. 21, 1997

[51] Int. Cl.[6] ............................................. B60R 21/22
[52] U.S. Cl. ................................ 280/730.2; 280/728.2
[58] Field of Search .............................. 280/728.2, 730.1, 280/730.2, 728.1, 743.1

[56] References Cited

U.S. PATENT DOCUMENTS

| | | |
|---|---|---|
| 5,082,310 | 1/1992 | Bauer . |
| 5,154,444 | 10/1992 | Nelson . |
| 5,344,183 | 9/1994 | Hersman et al. . |
| 5,368,327 | 11/1994 | Shiraki et al. . |
| 5,378,014 | 1/1995 | Cooper . |
| 5,393,089 | 2/1995 | Pakulsky et al. . |
| 5,427,408 | 6/1995 | Ando et al. . |
| 5,447,326 | 9/1995 | Laske et al. . |
| 5,498,030 | 3/1996 | Hill et al. ............................. 283/743.1 |
| 5,628,527 | 5/1997 | Olson et al. ......................... 283/730.2 |
| 5,630,615 | 5/1997 | Miesik ................................ 280/730.2 |
| 5,630,616 | 5/1997 | McPherson ......................... 280/730.2 |

FOREIGN PATENT DOCUMENTS 2267064  11/1993  United Kingdom .

*Primary Examiner*—Christopher P. Ellis
*Attorney, Agent, or Firm*—Daniel M. Stock, Esq.; Roger L. May, Esq.

[57] ABSTRACT

A seamless side inflatable restraint deployment system for an occupant seated in a seat includes a side inflatable restraint module attached to a frame of the seat and having an inflatable restraint, a pad disposed adjacent the side inflatable restraint module having a deployment opening therein, and a tear initiator envelope enclosing the side inflatable restraint module and extending through the deployment opening to concentrate deployment forces of the inflatable restraint to form a desired exit location in a seat trim of the seat for the inflatable restraint to deploy therethrough.

20 Claims, 1 Drawing Sheet

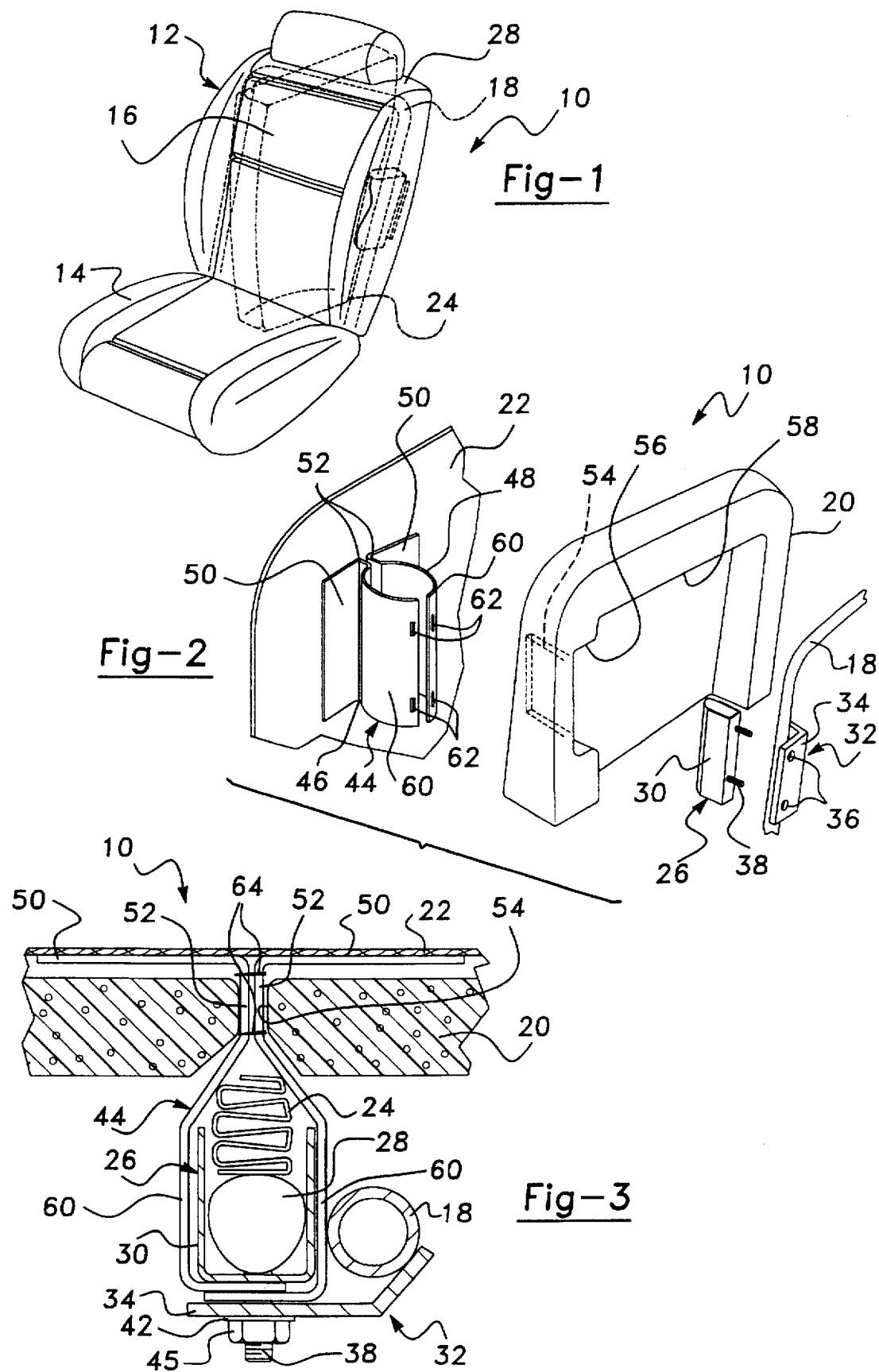

SEAMLESS SIDE INFLATABLE RESTRAINT DEPLOYMENT SYSTEM

BACKGROUND OF THE INVENTION

1. Field of the Invention

The present invention relates generally to inflatable restraints and, more specifically, to a seamless side inflatable restraint deployment system for a motor vehicle.

2. Description of the Related Art

A particular type of inflatable restraint for an occupant in a motor vehicle is commonly referred to as an air bag. The air bag is stored in the motor vehicle in an uninflated condition. When the motor vehicle experiences a collision-indicating condition of at least a predetermined threshold level, gas is directed to flow into the airbag from a gas producing source. The gas inflates the air bag to an extended condition in which the air bag extends into the occupant compartment of the motor vehicle. When the air bag is inflated into the occupant compartment, it restrains movement of the occupant to help protect the occupant from forcefully striking parts of the motor vehicle as a result of the collision.

The air bag is typically mounted in the vehicle as a part of an air bag module. In addition to the air bag, the air bag module includes an inflator and a reaction canister. The inflator is source of gas for inflating the air bag. The reaction canister contains the air bag and the inflator, and has a deployment opening through which the air bag emerges from the reaction canister when it is being inflated.

Typically, a deployment door extends over the deployment opening in the reaction canister to conceal the air bag and the other parts of the air bag module from the occupant compartment. The deployment door may be a part of a trim panel on an instrument panel of the motor vehicle.

When the inflator is actuated, the reaction canister directs the gas to flow from the inflator into the air bag. As the gas enters the air bag, it moves the air bag outward from the reaction canister through the deployment opening and forcefully against the deployment door. A closure portion of the deployment door is ruptured by the force of the fluid pressure in the air bag. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the reaction canister through the deployment opening and into the occupant compartment.

Although the above air bag and air bag module has worked well when mounted in the instrument panel, there is a need in the art for mounting an air bag to resist side impact on the occupant compartment. Also, there is a need in the art to provide a side air bag in a seat of a motor vehicle to retain outward appearance of the seat and eliminate the deployment door.

SUMMARY OF THE INVENTION

Accordingly, the present invention is a seamless side inflatable restraint deployment system for an occupant seated in a seat including a side inflatable restraint module attached to a frame of the seat and having an inflatable restraint, and a pad disposed adjacent the side inflatable restraint module having a deployment opening therein. The seamless side inflatable restraint deployment system also includes a tear initiator envelope enclosing the side inflatable restraint module and extending through the deployment opening to concentrate deployment forces of the inflatable restraint to form a desired exit location in a seat trim of the seat for the inflatable restraint to deploy therethrough.

One feature of the present invention is that a seamless side inflatable restraint deployment system is provided in a seat for a motor vehicle. Another feature of the present invention is that the side inflatable restraint deployment system allows for a seamless design (i.e., no deployment door) Yet another feature of the present invention is that the side inflatable restraint deployment system has a tear initiator envelope for predictable/repeatable tear seam location and performance. Still another feature of the present invention is that the side inflatable restraint deployment system resists foam fragmentation and maintains seat comfort.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of a seamless side inflatable restraint deployment system, according to the present invention, illustrated in operational relationship with a seat of a motor vehicle.

FIG. 2 is an exploded perspective view of the seamless side inflatable restraint deployment system and seat of FIG. 1.

FIG. 3 is a fragmentary plan view of the seamless side inflatable restraint deployment system and seat of FIG. 1.

DESCRIPTION OF THE PREFERRED EMBODIMENT(S)

Referring to the drawings and in particular FIG. 1, one embodiment of a seamless side inflatable restraint deployment system 10, according to the present invention, is illustrated in operational relationship with a seat, generally indicated at 12, for a motor vehicle (not shown). The seat 12 includes a generally horizontal seat portion 14 and a generally vertical back portion 16. Since the present invention may be used with either the seat portion 14 or the back portion 16, only the back portion 16 will be described.

The back portion 16 has a seat back frame 18. The seat back frame 18 has a generally inverted U-shape and is made of a hollow member or tube having a generally circular cross-section. The seat back frame 18 is made of a metal material. The back portion 16 has a seat back pad 20 disposed adjacent the seat back frame 18 and a seat trim 22 covering the seat back pad 20. The seat back pad 20 is made of a foam material. The seat trim 22 is made of a flexible fabric material such as cloth, vinyl, leather or the like. It should be appreciated that, up to this point in the description, the seat 12 is conventional and known in the art.

Referring to FIGS. 1 through 3, the seamless side inflatable restraint deployment system 10 includes a side inflatable restraint 24 such as an air bag and a side inflatable restraint module 26 for inflating the side inflatable restraint 24. The side inflatable restraint module 26 includes an inflator 28 and a reaction canister 30. The inflator 28 is the source of inflation fluid or gas for inflating the side inflatable restraint 24. The reaction canister 30 is generally U-shaped in cross-section and extends vertically to contain the inflator 28 and the side inflatable restraint 24.

The seamless side inflatable restraint deployment system 10 includes a fastening mechanism, generally indicated at 32, for removably fastening the side inflatable restraint module 26 to the seat back frame 18. The fastening mechanism 32 includes a plate 34 secured to the seat back frame 18 by suitable means such as welding. The plate 34 has a generally L-shaped cross-section. The plate 38 has at least one, preferably a pair of apertures 36 extending therethrough. The fastening mechanism 32 has at least one, preferably a pair of threaded fasteners 38 extending from the reaction canister 30 and through the apertures 36 in the plate 34. The fastening mechanism 32 includes a threaded nut 40 and a washer 42 for engaging each of the fasteners 38.

The seamless side inflatable restraint deployment system 10 further includes a tear initiator envelope, generally indicated at 44. The tear initiator envelope 44 is an envelope of a strong material, such as fabric thicker than the seat trim 22, which is strong enough to withstand the force of the deploying side inflatable restraint 24 and stronger that the seat trim fabric 22. The tear initiator envelope 44 has a first or left-handed member 46 and a second or right-handed member 48. Each of the first and second members 46 and 48 have an end or flange 50 extending transversely between the seat trim 22 and the seat back pad 20. The flange 50 is adhered and/or sewn to the underside of the seat trim 22 in a desired exit location for the side inflatable restraint 24. Each of the first and second members 46 and 48 have a connecting portion 52 extending generally perpendicular from the flange 50 and through a localized slit or deployment opening 54 in the seat back pad 20. The deployment opening 54 is a slit extending generally vertically from a front of the seat back pad 20 to a recess 56 in a back of the seat back pad 20. The recess 56 receives the side inflatable restraint module 26 and the seat back pad 20 has an enlarged cavity 58 for receiving the seat back frame 18.

Each of the first and second members 46 and 48 have a base portion 60 extending rearwardly to tightly encase the side inflatable restraint module 26. The base portion 60 has at least one, preferably a pair of apertures 62 which receive the fasteners 38 such that the base portion 60 is sandwiched between the reaction canister 30 and the plate 34. It should be appreciated that the base portion 60 may have any suitable shape to encase the side inflatable restraint module 26 as tight as possible while still allowing assembly.

The seamless side inflatable restraint deployment system 10 includes at least one, preferably two or more retention stitches 64 to initially hold together the connecting portions 52 of the first and second members 46 and 48 of the tear initiator envelope 44. The retention stitches 64 are preferably thread which is sewn to prevent the connecting portions 52 from opening during normal seat wear.

In operation, when the motor vehicle experiences a collision-indicating condition of at least a predetermined threshold level, the inflator 28 is actuated and the reaction canister 30 directs the gas to flow from the inflator 28 into the side inflatable restraint 24. As the gas enters the inflatable restraint 24, it moves the side inflatable restraint 24 outward from the reaction canister 30. As the side inflatable restraint 24 deploys, it tears the retention stitches 64 and moves through the tear initiator envelope 44 and deployment opening 54, forcing the flanges 50 to pull or tear the seat trim 22 apart to form an opening at the designated exit location. The side inflatable restraint 24 is inflated outward from the exit location in the seat trim 22 to extend into the occupant compartment of the motor vehicle as illustrated by the phantom lines in FIG. 1. When the side inflatable restraint 24 is inflated into the occupant compartment, it restrains movement of the occupant to help protect the occupant from forcefully striking parts on the side of the motor vehicle as a result of the collision.

Accordingly, the seamless side inflatable restraint deployment system 10 concentrates the deployment forces at the desired seat exit location, providing repeatable deployment exit and performance. The seamless side inflatable restraint deployment system 10 resists foam fragmentation due to the foam seat back pad 20 being protected from the deploying side inflatable restraint 24 by the tear initiator envelope 44. The seamless side inflatable restraint deployment system 10 is a seamless design which does not affect fit, finish or appearance of the seat trim 22. The seamless side inflatable restraint deployment system 10 maintains seat comfort by allowing full thickness foam seat back pad 20 to be used over the side inflatable restraint module 26.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seamless side inflatable restraint deployment system for an occupant seated in a seat comprising:
    a side inflatable restraint module attached to a frame of a seat and having an inflatable restraint;
    a pad disposed adjacent said side inflatable restraint module having a deployment opening extending therethrough; and
    a tear initiator envelope enclosing said side inflatable restraint module and extending through said deployment opening and said pad to concentrate deployment forces of said inflatable restraint to form a desired exit location in a seat trim of the seat for said inflatable restraint to deploy therethrough.

2. A seamless side inflatable restraint deployment system as set forth in claim 1 wherein said side inflatable restraint module comprises an inflator for inflating said inflatable restraint and a reaction canister containing said inflatable restraint and said inflator.

3. A seamless side inflatable restraint deployment system as set forth in claim 1 including a fastening mechanism for fastening said side inflatable restraint module to the frame.

4. A seamless side inflatable restraint deployment system as set forth in claim 3 wherein said fastening mechanism comprises a plate secured to the frame having at least one aperture, at least one fastener extending from said reaction canister through said at least one aperture, and means for engaging said at least one fastener.

5. A seamless side inflatable restraint deployment system as set forth in claim 1 wherein said tear initiator envelope has a first member and a second member.

6. A seamless side inflatable restraint deployment system as set forth in claim 5 including at least one retention member to initially hold together said first member and said second member.

7. A seamless side inflatable restraint deployment system as set forth in claim 6 wherein said at least one retention member is a retention stitch made of thread.

8. A seamless side inflatable restraint deployment system for an occupant seated in a seat comprising:
    a side inflatable restraint module attached to a frame of a seat and having an inflatable restraint;
    a pad disposed adjacent said side inflatable restraint module having a deployment opening therein;
    a tear initiator envelope enclosing said side inflatable restraint module and extending through said deployment opening to concentrate deployment forces of said inflatable restraint to form a desired exit location in a seat trim of the seat for said inflatable restraint to deploy therethrough, said tear initiator envelope having a first member and a second member; and each of said first member and second member having a flange extending transversely between the seat trim and pad and attached to the seat trim.

9. A seamless side inflatable restraint deployment system as set forth in claim 8 wherein each of said first member and said second member have a connecting portion extending generally perpendicular to said flange and through said deployment opening.

10. A seamless side inflatable restraint deployment system as set forth in claim 9 wherein each of said first member and said second member have a base portion extending from said connecting portion to encase said side inflatable restraint module.

11. A seamless side inflatable restraint deployment system as set forth in claim 10 wherein said base portion has at least one aperture to allow said fastening mechanism to extend therethrough.

12. A seamless side inflatable restraint deployment system as set forth in claim 1 wherein said tear initiator envelope is made of a material stronger than the seat trim.

13. A seamless side inflatable restraint deployment system for an occupant seated in a seat comprising:

a side inflatable restraint module attached to a frame of a seat and having an inflatable restraint;

a pad disposed adjacent said side inflatable restraint module having a deployment opening extending therethrough;

a tear initiator envelope having a first member and a second member enclosing said side inflatable restraint module and extending through said deployment opening and said pad to concentrate deployment forces of said inflatable restraint to form a desired exit location in a seat trim of the seat for said inflatable restraint to deploy therethrough; and at least one retention member to initially hold together said first member and said second member.

14. A seamless side inflatable restraint deployment system as set forth in claim 13 including a fastening mechanism for fastening said side inflatable restraint module to the frame.

15. A seamless side inflatable restraint deployment system as set forth in claim 14 wherein said fastening mechanism comprises a plate secured to the frame having at least one aperture, at least one fastener extending from said reaction canister through said at least one aperture, and means for engaging said at least one fastener.

16. A seamless side inflatable restraint deployment system for an occupant seated in a seat comprising:

a side inflatable restraint module attached to a frame of a seat and having an inflatable restraint;

a pad disposed adjacent said side inflatable restraint module having a deployment opening therein;

a tear initiator envelope having a first member and a second member enclosing said side inflatable restraint module and extending through said deployment opening to concentrate deployment forces of said inflatable restraint to form a desired exit location in a seat trim of the seat for said inflatable restraint to deploy therethrough;

at least one retention member to initially hold together said first member and said second member; and each of said first member and second member having a flange extending transversely between the seat trim and pad and attached to the seat trim.

17. A seamless side inflatable restraint deployment system as set forth in claim 16 wherein each of said first member and said second member have a connecting portion extending generally perpendicular to said flange and through said deployment opening.

18. A seamless side inflatable restraint deployment system as set forth in claim 17 wherein each of said first member and said second member have a base portion extending from said connecting portion to encase said side inflatable restraint module.

19. A seamless side inflatable restraint deployment system as set forth in claim 13 wherein said tear initiator envelope is made of a material stronger than the seat trim.

20. A seamless side inflatable restraint deployment system for an occupant seated in a seat comprising:

a side inflatable restraint module attached to a frame of a seat and having an inflatable restraint, an inflator for inflating said inflatable restraint and reaction canister containing said inflatable restraint and said inflator;

a fastening mechanism for fastening said side inflatable restraint module to the frame;

a pad disposed adjacent said side inflatable restraint module having a deployment opening therein;

a tear initiator envelope having a first member and a second member enclosing said side inflatable restraint module and extending through said deployment opening to concentrate deployment forces of said inflatable restraint to form a desired exit location in a seat trim of the seat for said inflatable restraint to deploy therethrough;

at least one retention member to initially hold together said first member and said second member; and wherein each of said first member and second member have a flange extending transversely between the seat trim and pad and attached to the seat trim, a connecting portion extending generally perpendicular to said flange and through said deployment opening, and a base portion extending from said connecting portion to encase said side inflatable restraint module.

* * * * *